(12) United States Patent
Grobecker

(10) Patent No.: US 6,241,089 B1
(45) Date of Patent: Jun. 5, 2001

(54) HOLDING DEVICE ARRANGED ON A BASE PLATE INCLUDING CLAMPING NOSES

(75) Inventor: Hermann Grobecker, Garbsen (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/463,080

(22) PCT Filed: May 14, 1999

(86) PCT No.: PCT/IB99/00877

§ 371 Date: Jan. 18, 2000

§ 102(e) Date: Jan. 18, 2000

(87) PCT Pub. No.: WO99/60563

PCT Pub. Date: Nov. 25, 1999

(30) Foreign Application Priority Data

May 20, 1998 (DE) .............................. 198 22 807

(51) Int. Cl.[7] .................................. B65D 85/57

(52) U.S. Cl. ................. 206/310; 206/308.1; 206/493

(58) Field of Search .................. 206/308.1, 310, 206/493

(56) References Cited

U.S. PATENT DOCUMENTS

| 5,494,156 | * | 2/1996 | Nies ........................... 206/310 |
| 5,626,225 | * | 5/1997 | Joyce, Jr. .................. 206/308.1 |
| 5,660,274 | * | 8/1997 | Chien ....................... 206/308.1 |
| 5,727,680 | * | 3/1998 | Liv ........................... 206/308.1 |
| 5,855,273 | * | 1/1999 | Grobecker et al. .......... 206/310 |
| 5,950,822 | * | 9/1999 | Cloron et al. ............... 206/310 |

FOREIGN PATENT DOCUMENTS

0817196A1  1/1998  (DE) .

* cited by examiner

Primary Examiner—Bryon P. Gehman
(74) Attorney, Agent, or Firm—Michael E. Belk

(57) ABSTRACT

A housing having a holding device comprising a base plate with a circular arrangement of radially resilient clamping limbs having radially outward clamping surfaces for engagement in a central opening of at least one disc-shaped information carrier, for example a CD. The base plate also has a circular arrangement of rigid supporting limbs having: radially outward supporting surfaces interposed between the clamping limbs; and radially resilient clamping noses having radially outward clamping surfaces for engagement in the central opening of the disc-shaped information carrier. The clamping noses allowing the clamping force on the information disc to be increased without reducing the immunity to severe impact loads.

11 Claims, 6 Drawing Sheets

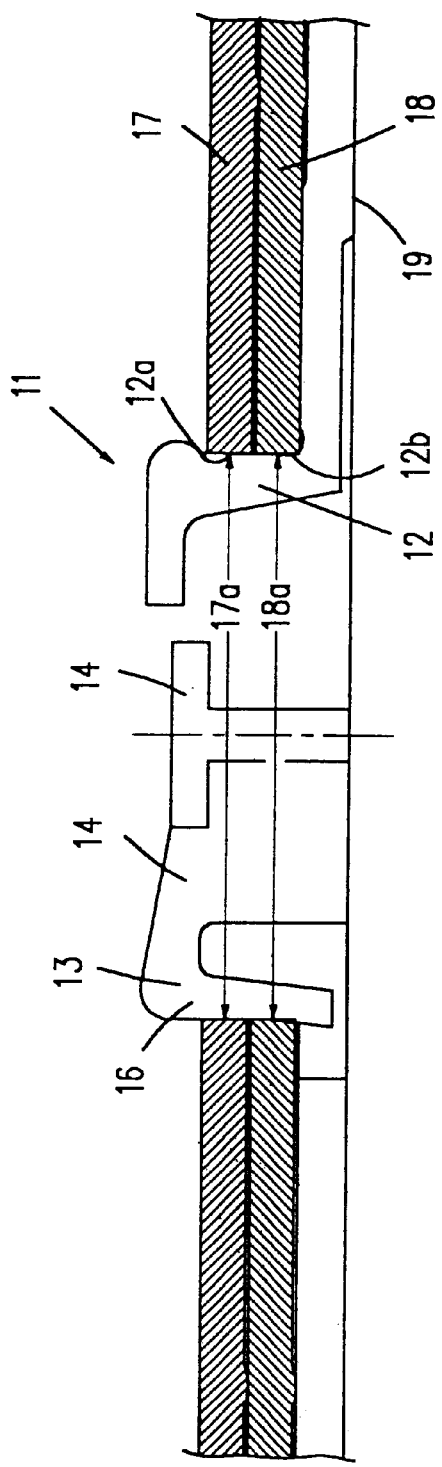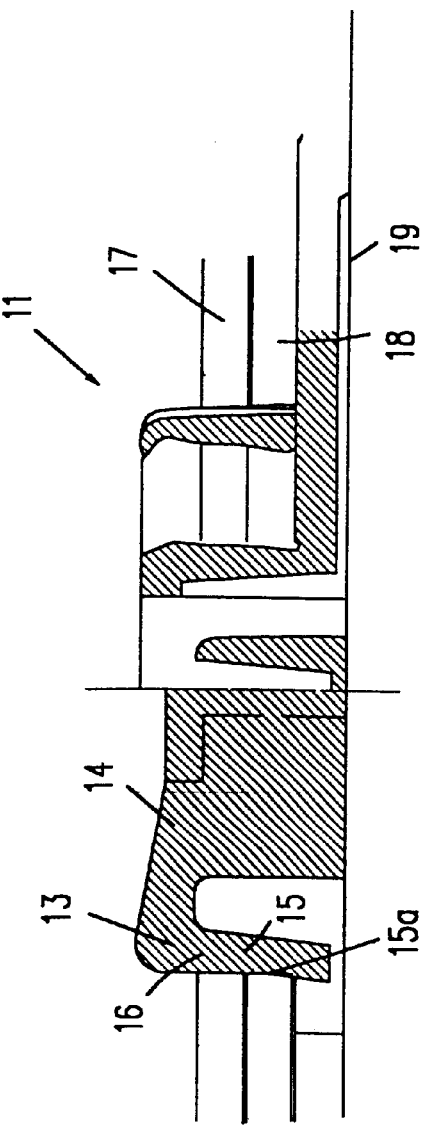

HOLDING DEVICE ARRANGED ON A BASE PLATE INCLUDING CLAMPING NOSES

FIELD OF THE INVENTION

The invention is related to the field of CD housings commonly known as jewel boxes.

BACKGROUND OF THE INVENTION

The invention relates to a housing having a holding device arranged on a base plate and including a circular arrangement of radially resilient clamping limbs having radially outward clamping surfaces for engagement in a central opening of at least one disc-shaped information carrier, for example a CD. The arrangement also includes rigid supporting limbs having radially outward supporting surfaces being interposed between the clamping limbs. The diameter of the circular arrangement of supporting surfaces being slightly smaller than the diameter of the central opening of the information carrier.

Such a housing is known, for example from EP 817 196 A1. This known housing has radially resilient clamping limbs arranged in a circle and having radially outward clamping surfaces for engagement in a central opening of a disc-shaped information carrier. In order to prevent the clamping elements in the case of impact loads rigid supporting limbs having radially outward supporting surfaces are interposed between the clamping limbs. The supporting surfaces are arranged in a circle whose diameter is slightly smaller than the diameter of the central opening of the information disc, as a result of which the supporting surfaces do not exert a clamping force on the information disc.

SUMMARY OF THE INVENTION

It is an object of the invention to provide a housing of the type defined in the opening paragraph, which allows the clamping force on the information disc to be increased without the immunity to impact loads being affected.

According to the invention this is achieved in a housing of the type defined in the opening paragraph in that the rigid supporting limbs have radially resilient clamping noses having radially outward clamping surfaces for engagement in the central opening of the disc-shaped information carrier.

Such a construction provides an increased number of clamping surfaces adapted to engage in the central opening of the disc-shaped information carrier. On the one hand, the rigid supporting limbs perform a clamping function, to clamp the disc-shaped information carrier by means of the resilient clamping noses. On the other hand, the rigid supporting limbs also guarantee that in the case of severe shock loads the CD is urged against the supporting surfaces of the supporting limbs with the edge of its central opening and thus a further load on the clamping limbs and of the resilient clamping noses is taken up, thereby precluding the risk of breakage of the clamping limbs and the resilient clamping noses.

The right-angled shape of the supporting limbs as defined in claim 2 allows an optimum protection of the information carrier in the case impact loads and the extension of these limbs into the area of ends of the clamping limbs guarantees that an effective protection in any position.

The advantageous embodiment of the invention defined in claim 3 provides a higher reliability of the construction. Moreover, the supporting limbs can be thinner because now the principal forces of an impact load are taken up by the rigid supporting element.

In the advantageous embodiment of the invention defined in claim 4 individual clamping limbs act from the periphery of the holding device. This is advantageous in order to enable the information carrier to be snapped easily and simply onto the clamping element.

In the advantageous embodiment of the invention defined in claim 6 the individual clamping limbs act from the center of the holding device. This enables the information disc to be removed easily and simply from the holding device.

The advantageous embodiment of the invention defined in claim 6 is particularly simple and cheap.

The holding device in accordance with the invention can be used particularly advantageously in housings adapted to hold more than one information disc.

For such a housing, as is defined in claim 7, the clamping surfaces of the clamping limbs and the clamping surfaces of the supporting limbs for clamping each information carrier are arranged in at least two different planes. Thus, in an arrangement with two information discs the clamping surfaces of the supporting limbs hold the first information disc and the clamping surfaces of the clamping limbs hold the second information disc. The two information discs are clamped one over the other. This arrangement is particularly advantageous because obviously in housings which accommodate more than one information disc only a smaller number of clamping limbs is available for clamping each information carrier. By means of an arrangement in accordance with the invention the supporting limbs also have a clamping function and the available space is used to an optimum extent. At the same time the arrangement is protected against impact loads by means of the rigid supporting limbs, as a result of which the clamping limbs and the clamping noses of the supporting limbs are not damaged in the case of severe impact loads.

In the advantageous embodiment of the invention defined in claim 8 the clamping surfaces of the clamping limbs are arranged above the clamping surfaces of the supporting limbs. This means that the lower information disc which is first supported on the base plate is clamped by means of the clamping surfaces of the supporting surfaces and the second information disc disposed above it is clamped by means of the clamping surfaces of the clamping limbs. This is advantageous for reasons of production engineering.

The advantageous embodiment of the invention defined in claim 9 enables information carriers superposed inside a housing to be held securely. The invention can be used advantageously in the housing defined in claim 10 and claim 11.

Embodiments of the invention will be described in more detail, by way of example, with reference to FIGS. 1 to 8 of the drawings. In the drawings:

BRIEF DESCRIPTION OF THE DRAWING

FIG. 2 is a sectional view taken on the line II—II in FIG. 1, FIG. 3 shows in the left half a sectional view taken on the line III—III in FIG. 1 and in the right half a view X taken in the direction indicated by the arrow X in FIG. 1.

DETAILED DESCRIPTION OF THE PREFERRED EMBODIMENT

Figure 1:
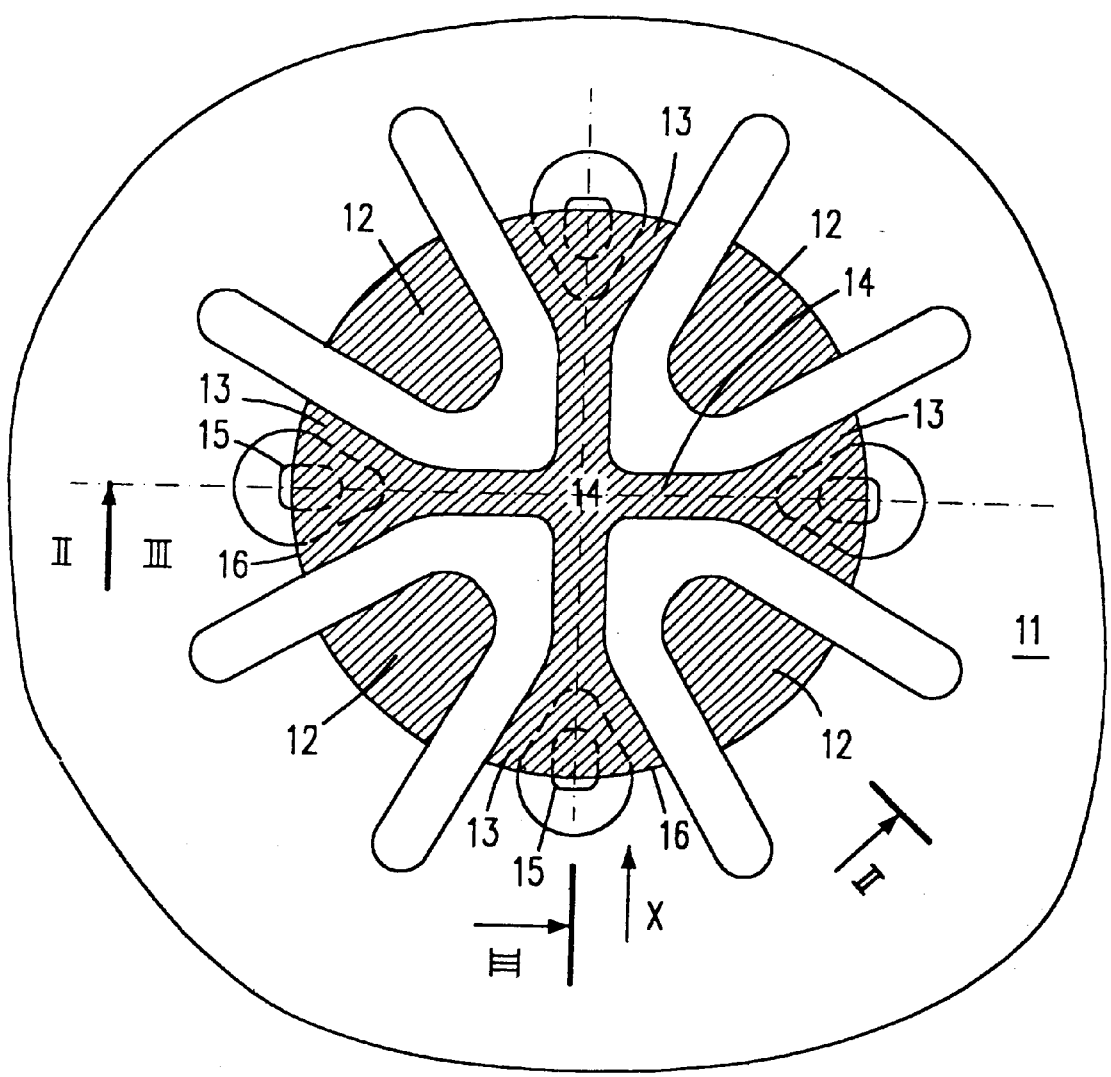
FIG. 1 is plan view of a holding device for an information disc, which device includes a base plate in the form of a tray, the base plate having integral clamping limbs and extending from the periphery of the holding device towards the center of the holding device.

FIG. 1 is a plan view of a base plate in the form of a tray 10 which is integral with a central holding device 11. The tray 10, which is shown partly in FIG. 1, is mounted in a customary manner in a bottom section of a housing, not shown, which is then closed by a cover section. Such a housings are commercially available and are known since long. The holding device 11 serves for holding and clamping information discs, particularly CDs. In the present example the holding device shown in FIG. 1 includes four clamping limbs 12 circumferentially spaced along circle as well as four spaced supporting limbs 13 likewise circumferentially spaced along a circle. The supporting limbs 13 are integral with a supporting element 14, the supporting element 14 taking the form of a cross-shaped spoke wheel. The supporting limbs 13 have clamping noses 15. The clamping limbs 12 and the clamping noses 14 serve for clamping and holding two superposed disc-shaped information carriers (CDs) and have suitably shaped radially outward clamping surfaces, as will be described in detail with reference to FIG. 2 and FIG. 3. The supporting limbs 13 further have radially outward supporting surfaces 16.

The clamping limbs 12 are integral with the tray 10 and extend from the periphery of the holding device 11 towards the center of the holding device 11.

FIG. 2 is a sectional view taken on the line II—II in FIG. 1. The radially resilient clamping limbs 12 shown in FIG. 2 have upper clamping surfaces 12a which taper off conically towards the plane 19 of the tray 10, and lower surfaces 12b which adjoin said upper clamping surfaces. The clamping surfaces 12a serve for clamping an upper information disc 17 and the lower surfaces 12b do not have a clamping function. The clamping noses 15 of the supporting limbs 13 have inclined clamping surfaces 15a, which serve for clamping a lower information disc 18. The supporting limbs 13 further have supporting surfaces 16 which extend substantially perpendicularly to the plane 19 and which do not have a clamping function.

The outer diameter of the lower surfaces 12b is slightly smaller than the diameter of the central openings 17a and 17b of the information discs 17 and 18, respectively, while the largest outer diameter of the upper clamping surfaces 12a is slightly greater than the diameter 17a, 18a of the central openings of the information discs 17 and 18.

The diameter of the circular arrangement of supporting surfaces 16 is selected to be slightly smaller than the diameter of the central openings 17a, 17b of the lower information disc 18 and of the upper information disc 17, respectively.

FIG. 3 shows in the left half the sectional view taken on the line III—III in FIG. 1 and in the right half a view X taken in the direction indicated by the arrow X in FIG. 1.

Figure 4:
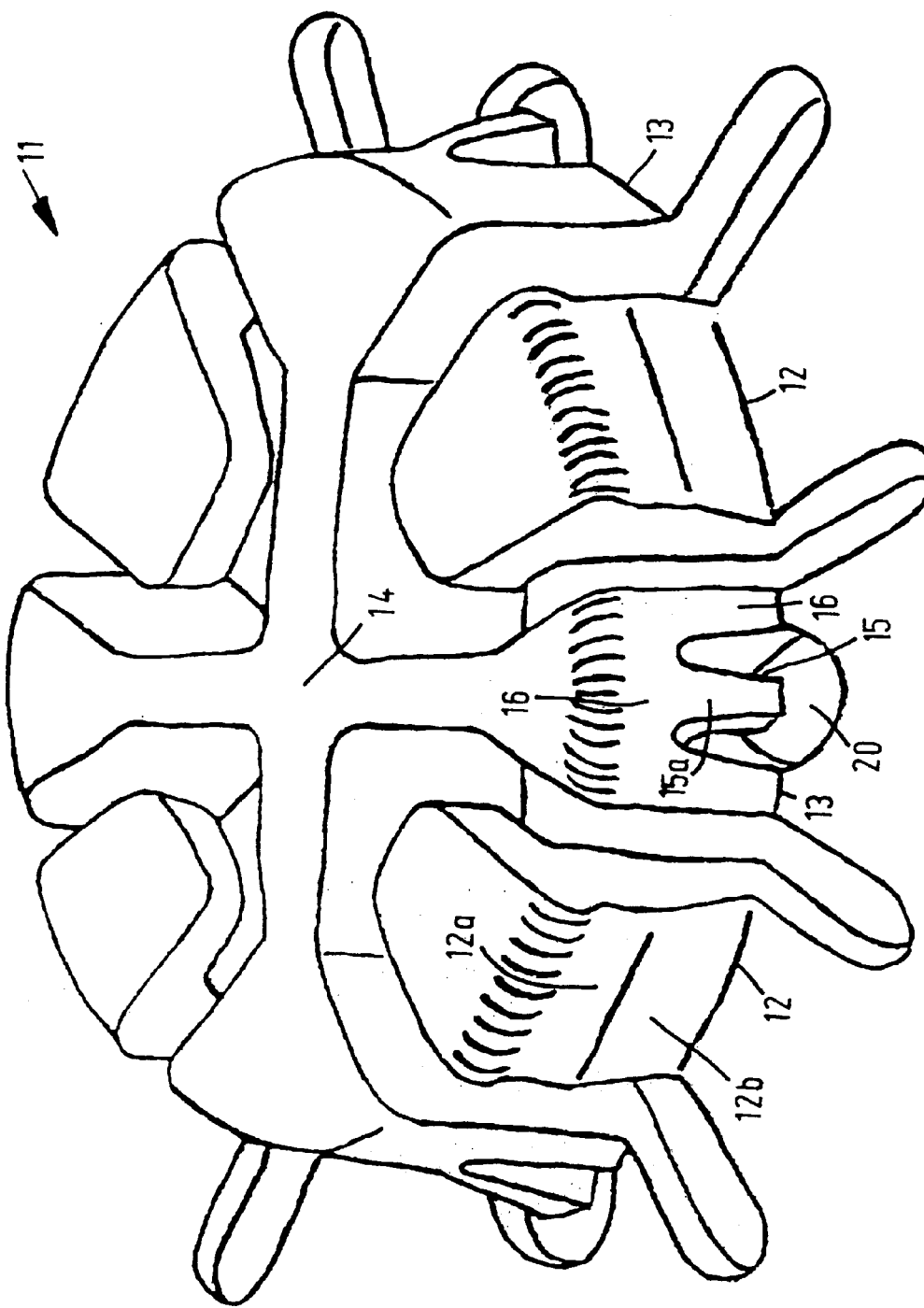
FIG. 4 is a perspective view of the holding device shown in FIG. 1.

FIG. 4 is a perspective view of the holding device 11. It can be seen that the clamping noses 15 of the supporting limbs 13 are enclosed by the supporting surfaces 16 both at the sides and at the top. The clamping noses 15 on the supporting limbs 13 are formed with a cavity 20 to provide the elastic properties of the clamping noses 15.

Figure 5:
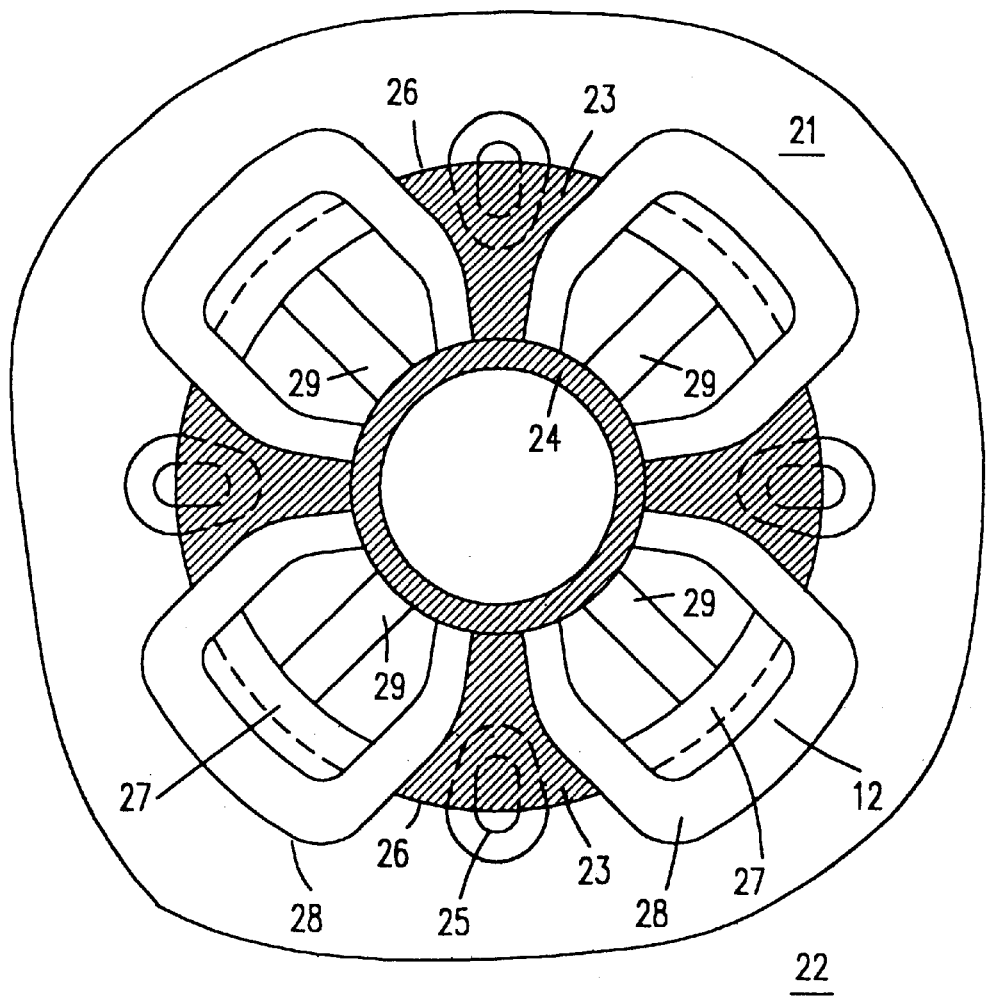
FIG. 5 is a plan view of an alternative holding device having a base plate in the form of a tray, the clamping limbs being integral with a central annular supporting element and extending radially outward from the central supporting element.

FIG. 5 is a plan view of an alternative holding device 21 having a base plate in the form of a tray 22. The difference with the holding device 11 as shown in FIGS. 1 to 4 is that supporting limbs 23 have been provided which integrally connected by means of an annular supporting element 24.

Figure 6:
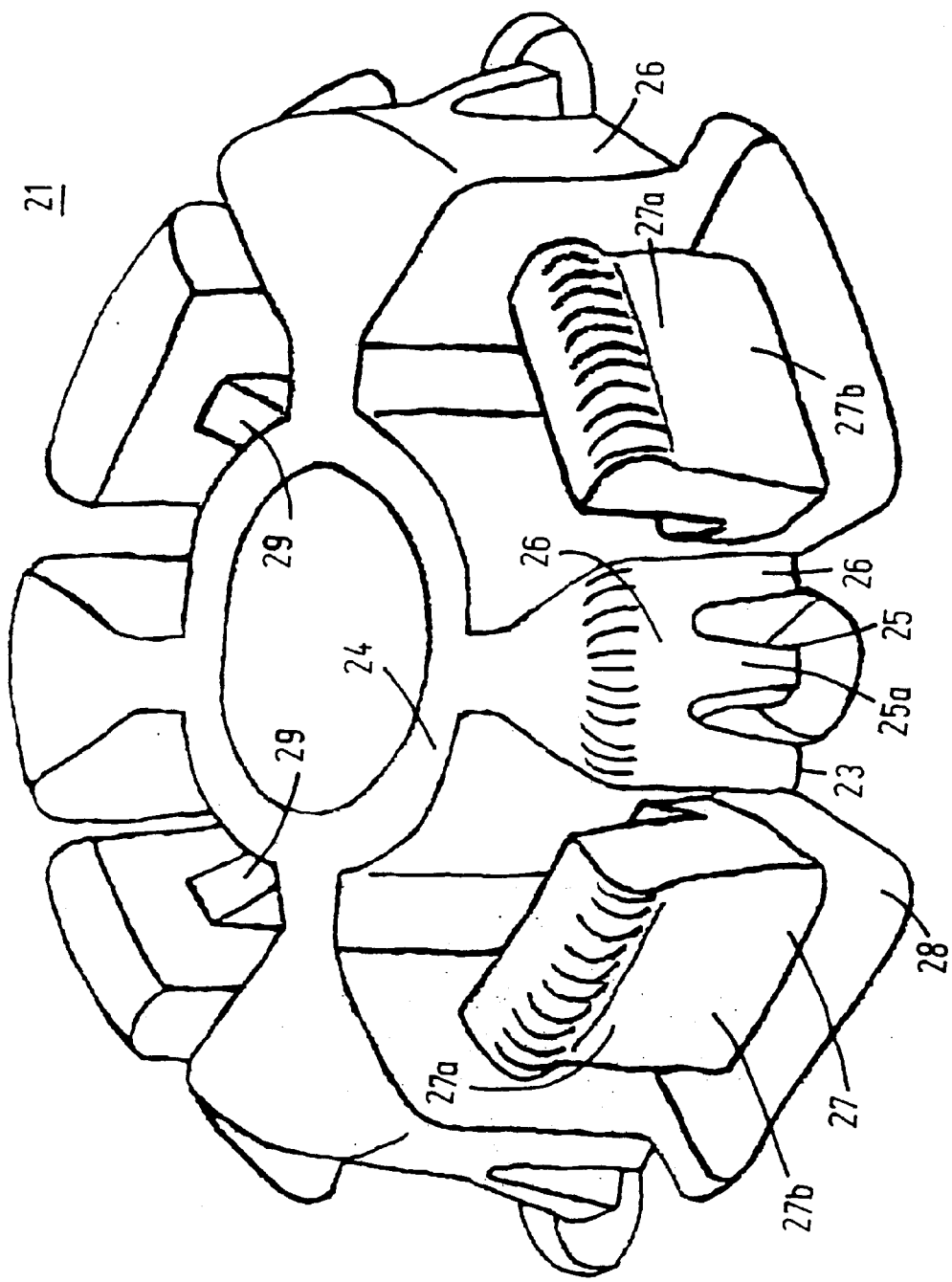
FIG. 6 is a perspective view of the alternative holding device.

FIG. 6 shows the alternative holding device 21 in a perspective view. The supporting limbs 23 have radially resilient clamping noses 25 and supporting surfaces 26. Clamping limbs 27 which extend radially outwards between the supporting limbs 23 are injection-molded integrally with the annular supporting element 24. Inside the tray 22 of the holding device 21 the clamping limbs 27 enclosed by U-shaped recesses 28. As a result of this, the clamping limbs 27 are radially resilient. Each of the clamping limbs 27 is formed with a stiffening rib 29. Thus, the clamping limbs 27 are integral with the central supporting element 24 and extend radially outwards from the central supporting element.

The clamping limbs 27 have inclined upper clamping surfaces 27a for clamping an upper information disc, not shown, and lower surfaces 27b which adjoin these upper clamping surfaces 27b and which are disposed in the area of a lower information disc, not shown, which lower surfaces do not have a clamping function. This is achieved in that the outer diameter of the passive lower surfaces is slightly smaller than the diameter of the central openings of the information discs, while the largest diameter of the upper clamping surfaces 27a is slightly greater than the diameter of the central openings of the information discs.

The clamping noses 25 of the supporting limbs 23 have inclined clamping surfaces 25a, which serve for clamping a lower information disc, not shown. The supporting limbs 23 further have supporting surfaces 26 which extend substantially perpendicularly to the plane of the tray 22 and which do not have a clamping function.

The diameter of the circular arrangement of supporting surfaces 26 is selected to be slightly smaller than the diameter of the central openings of the information discs.

The annular supporting element 24 can be manufactured particularly simply by injection-molding and also saves material.

Figure 7:
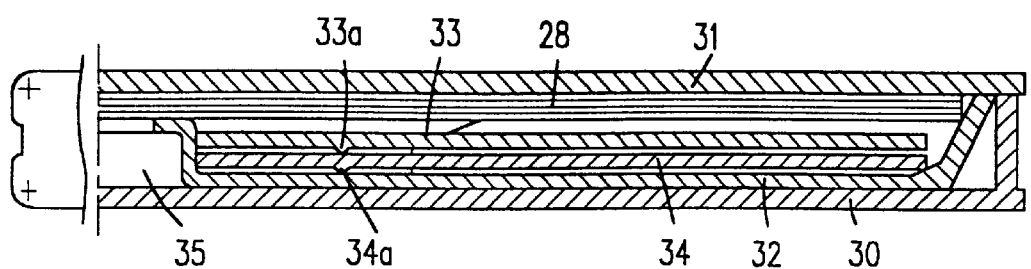
FIG. 7 is a sectional side view of a housing adapted to accommodate two information carriers.

FIG. 7 is a sectional side view of a housing for accommodating two information discs, the left-hand side being shown only partly and not in sectional view. The housing has a bottom section 30, a cover section 31 and a tray 32 mounted in the bottom section, which tray carries a holding device 35 for holding two information discs 33, which holding device is constructed in accordance with the invention in a manner not shown. The reference symbols 33a, 34a denote projecting rings. The reference numeral 36 refers to a leaflet.

Figure 8:
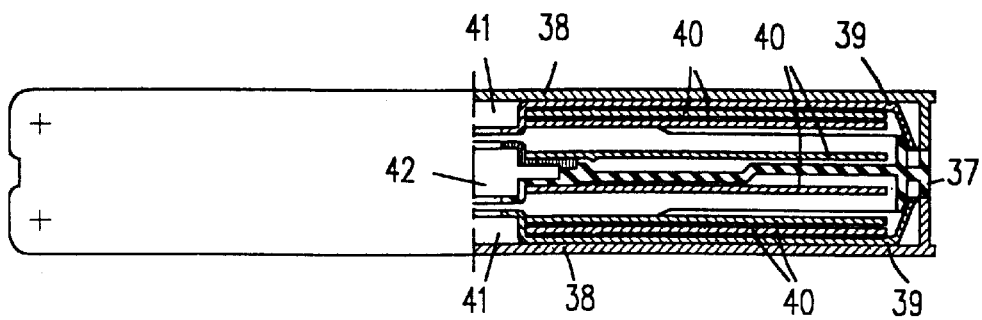
FIG. 8 is a sectional side view of a housing having a central section adapted to accommodate six information discs.

FIG. 8 is a sectional side view of a housing having a central section for accommodating six CDs, the left-hand part of the housing not being shown in sectional view. This housing has a central section 37 and two similarly constructed cover sections 38 each provided with a tray 39 for accommodating two CDs 40 each. The central section carries two further CDs 40. The holding devices 41, 42 of the two cover sections 38 and of the central section 37 are constructed in accordance with the invention, which is not shown here.

What is claimed is:

1. A holding device comprising:
   a base plate for supporting at least one disc-shaped information carrier;
   a circular arrangement of multiple radially resilient clamping limbs having radially outward clamping surfaces for engagement in a central opening of the disc-shaped information carrier; and
   a circular arrangement of rigid supporting limbs having: radially outward supporting surfaces interposed between the clamping limbs and radially resilient clamping noses with radially outward clamping surfaces for engagement in the central opening of the disc-shaped information carrier, the diameter of the circular arrangement of supporting surfaces being slightly smaller than the diameter of the central opening of the information carrier.

2. The device of claim 1, in which the supporting limbs extend substantially perpendicularly to a plane of the base plate and project substantially into the distal areas of the clamping limbs.

3. The device of claim 1, in which the supporting limbs are fixedly connected to one another by a common rigid supporting element.

4. The device of claim 1, in which the clamping limbs are integral with the base plate and extend from the periphery of the holding device towards the center of the holding device.

5. The device of claim 3, in which the clamping limbs are integral with the central supporting element and extend radially outwards from the central supporting element.

6. The device of claim 1, in which the supporting element and the supporting limbs are integral with the holding device and the base plate.

7. The device of claim 1, in which the clamping surfaces of the clamping limbs and the clamping surfaces of the supporting limbs are arranged in at least two different planes for clamping each one information carrier.

8. The device of claim 7, in which the clamping surfaces of the clamping limbs are disposed above the clamping surfaces of the supporting limbs.

9. The device of claim 7, in which:
   the clamping surfaces of the supporting limbs and of the clamping limbs, which surfaces are disposed in different planes, are tapered towards the plane of the base plate in such a manner that the largest outer diameter of the circular arrangement of clamping surfaces of the supporting limbs and of the clamping limbs is slightly greater than the diameter of the central opening of the information carrier;
   the straight surfaces of the clamping limbs, which surfaces adjoin the respective clamping surfaces of the clamping limbs, extend substantially perpendicularly to the plane of the plate and their outer diameter is slightly smaller than the diameter of the central opening of the information carrier; and
   the outer diameter of the supporting surfaces of the supporting limbs with the information carrier clamped in place is equal to or slightly smaller than the outer diameter of the straight surfaces of the clamping limbs.

10. A housing comprising:
    a bottom section;
    a cover section which is pivotably mounted on the bottom section;
    a base plate adapted to be mounted in the bottom section and enclosed between the bottom section and cover section
    a circular arrangement of multiple radially resilient clamping limbs having radially outward clamping surfaces for engagement in a central opening of the disc-shaped information carrier; and
    a circular arrangement of rigid supporting limbs having: radially outward supporting surfaces interposed between the clamping limbs and radially resilient clamping noses with radially outward clamping surfaces for engagement in the central opening of the disc-shaped at least one information carrier, the diameter of the circular arrangement of supporting surfaces being slightly smaller than the diameter of the central opening of the information carrier.

11. A housing comprising:
    a central section;
    two similarly constructed cover sections which are pivotably connected to the central section;
    a respective holding device enclosed between the central section and each cover section, each holding device including:
      a base plate for supporting a disc-shaped information carrier;
      a circular arrangement of multiple radially resilient clamping limbs having radially outward clamping surfaces for engagement in a central opening of the disc-shaped information carrier; and
      a circular arrangement of rigid supporting limbs having: radially outward supporting surfaces interposed between the clamping limbs and radially resilient clamping noses with radially outward clamping surfaces for engagement in the central opening of the disc-shaped information carrier, the diameter of the circular arrangement of supporting surfaces being slightly smaller than the diameter of the central opening of the information carrier.

* * * * *